United States Patent
Bartek et al.

(10) Patent No.: US 8,137,632 B2
(45) Date of Patent: *Mar. 20, 2012

(54) BIOMASS CONVERSION PROCESS

(75) Inventors: Robert Bartek, Centennial, CO (US); Steve Yanik, Colorado Springs, CO (US); Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/612,378

(22) Filed: Nov. 4, 2009

(65) Prior Publication Data
US 2010/0113849 A1   May 6, 2010

Related U.S. Application Data

(60) Provisional application No. 61/111,012, filed on Nov. 4, 2008.

(51) Int. Cl.
*F27B 15/08* (2006.01)
*C07C 4/00* (2006.01)

(52) U.S. Cl. ........ 422/144; 585/240; 585/242; 585/638; 422/145; 422/147

(58) Field of Classification Search .................. 585/240, 585/242, 638, 639; 422/144, 145, 147
See application file for complete search history.

(56) References Cited

U.S. PATENT DOCUMENTS

| | | | | |
|---|---|---|---|---|
| 6,538,169 B1 * | 3/2003 | Pittman et al. | ................. | 585/653 |
| 7,029,571 B1 * | 4/2006 | Bhattacharyya et al. | ....... | 208/76 |
| 7,083,762 B2 * | 8/2006 | Kuechler et al. | .............. | 422/144 |
| 7,122,160 B2 * | 10/2006 | Brookhart | ...................... | 422/145 |
| 7,195,741 B2 * | 3/2007 | Lattner et al. | ................. | 422/141 |
| 7,288,685 B2 * | 10/2007 | Marker | ........................ | 585/240 |
| 7,385,099 B2 * | 6/2008 | Kuechler et al. | .............. | 585/640 |
| 7,901,568 B2 * | 3/2011 | O'Connor et al. | ............ | 208/411 |
| 2009/0026112 A1 * | 1/2009 | Dierickx et al. | .............. | 208/119 |

* cited by examiner

*Primary Examiner* — Nina Bhat
(74) *Attorney, Agent, or Firm* — Hovey Williams LLP

(57) ABSTRACT

A process is described including: contacting solid biomass with a first catalyst stream in a first reaction zone operated at a temperature $T_1$ (from about 250 to about 400° C.), for conversion of a portion of the solid biomass and forming a first gaseous product stream; downwardly passing unconverted biomass to a second reaction zone for contact with a second catalyst stream charged to the second reaction zone operated at a temperature $T_2$, for conversion to form a second gaseous product stream and a spent catalyst; burning coke off the spent catalyst in a regenerator to form a regenerated catalyst; charging a portion of the regenerated catalyst to each of the first and second reaction zones, as the first and second catalyst streams, respectively; upwardly passing the second gaseous product stream to the first reaction zone; and removing both first and second gaseous product streams from the first reaction zone.

20 Claims, 1 Drawing Sheet

BIOMASS CONVERSION PROCESS

BACKGROUND OF THE INVENTION

1. Field of the Invention

The invention relates generally to a catalytic cracking process for solid biomass, and more particularly to a catalytic process characterized by use of at least two reaction zones, optionally with a catalyst/feedstock contact time in the millisecond range.

2. Description of the Related Art

Thermal processes, such as pyrolysis, have been proposed for the conversion of solid biomass material to liquid products. In general, temperatures in excess of 450° C. are required for these non-catalytic processes. The primary liquid reaction products are prone to degradation under these reaction conditions. As a result, products of pyrolysis reactions of solid biomass tend to be of poor quality.

Catalytic processes have been proposed for the conversion of solid biomass materials. The use of catalysts permits operation of the conversion reaction at lower temperatures than those required in non-catalytic pyrolysis. These lower conversion temperatures result in liquid reaction products of better quality. An example of a catalytic process is the biomass catalytic cracking process disclosed in WO2007/128800.

In spite of this improvement, the products of biomass catalytic cracking processes ("BCC") still suffer from poor stability and high acid numbers.

Thus, there is a particular need for an improved BCC process in which the degradation of primary conversion reaction products is further reduced.

BRIEF SUMMARY OF THE INVENTION

The present invention addresses these problems by providing a process for converting solid particulate biomass, said process comprising the steps of:
 (i) providing a composite of solid particulate biomass and a catalytic material;
 (ii) contacting the composite with a particulate heat carrier material during a contact time of from 50 milliseconds to 1000 milliseconds, preferably from 100 milliseconds to 500 milliseconds.

Another aspect of the invention comprises a method for removing liquid reaction products as they are formed. Another aspect of the invention is simultaneously providing an intimate contact of the biomass particles with the catalytic material and size reduction of the biomass particles with and by the perpendicular flow of catalyst and biomass.

BRIEF DESCRIPTION OF THE DRAWINGS

The features and advantages of the invention will be appreciated upon reference to the following drawing.

DESCRIPTION OF ILLUSTRATIVE EMBODIMENTS

Figure 1:
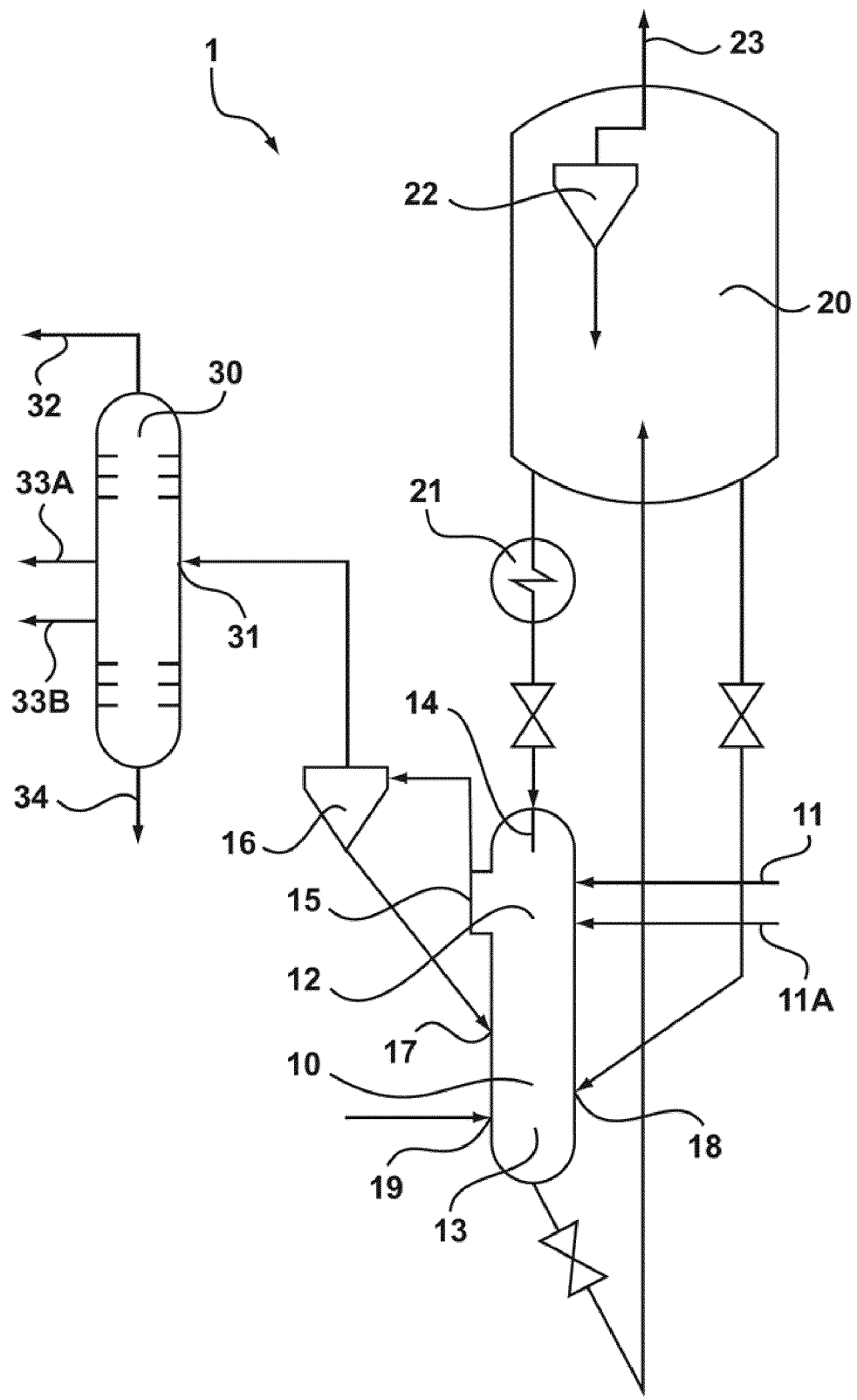
FIG. 1 is a schematic view of one embodiment of the invention showing the main components of an exemplary conversion unit.

The following is a description of certain embodiments of the invention, given by way of example only and with reference to the drawing.

As compared to hydrocarbon conversion reactions, the conversion of solid biomass material poses specific challenges. Being solid, the feedstock material does not readily interact with a solid catalyst material. There is often a need to compensate for the poor catalyst contact by applying high reaction temperatures. The reaction products contain significant amounts of oxygen, making them chemically unstable. The primary reaction products are more reactive than the feedstock, making it difficult to prevent conversion of the primary reaction products to secondary reaction products.

The present invention addresses these problems by providing a process for converting solid particulate biomass, said process comprising the steps of:
 (i) providing a composite of solid particulate biomass and a catalytic material;
 (ii) contacting the composite with a particulate heat carrier material during a contact time of from 50 milliseconds to 1000 milliseconds, preferably from 100 milliseconds to 500 milliseconds.

An important aspect of the present invention is the composite of solid particulate biomass and a catalytic material. The term "composite" as used herein refers to a particulate biomass material in intimate mixture with a catalytic material. The catalytic material may be a particulate material, or may be dissolved in a suitable solvent. A combination of a particulate catalytic material and a dissolved catalytic material may also be used.

An intimate mixture or composite of the solid particulate biomass material and a particulate catalytic material may be prepared by any mechanical mixing technique, such as milling, grinding, kneading, extrusion, and the like.

A composite of the solid particulate biomass material and a dissolved catalytic material may be prepared by impregnating the biomass material with the dissolved catalytic material.

A class of preferred catalytic materials are mixed metal oxides, layered cationic materials, and hydrotalcite-like materials. Combinations of an alkali metal carbonate and a hydrotalcite-like material (including hydrotalcite per se), are highly preferred.

Another class of suitable catalytic materials is the crystalline aluminosilicates, such as zeolites.

Particularly preferred are the carbonates, hydroxides and oxides of alkali and earth alkaline metals, in particular NaOH, KOH, $Na_2CO_3$, and $K_2CO_3$. These materials may be mixed with the biomass material in particulate form, or in the form of a solution in a suitable solvent. Preferred solvents are aqueous liquids, in particular water.

In a specific embodiment the solid biomass is impregnated with a solution of a soluble inorganic material and intimately mixed with an insoluble, particulate inorganic material. The steps of impregnating the solid biomass with a solution of an inorganic material and of intimately mixing the solid biomass with a particulate inorganic material may be combined, or may be carried out in sequence. Preferred soluble inorganic materials are the hydroxides and carbonates of sodium and potassium. Preferred insoluble, particulate inorganic materials are layered anionic materials, in particular hydrotalcite and hydrotalcite-like materials.

The feedstock generally is a solid biomass material of plant origin, typically comprising cellulose. The process of the invention is particularly suitable for lignocellulosic biomass materials. Suitable examples include wood, straw, grasses, bagasse, corn stover, and the like. Preferred are wood and straw, because of their abundant availability. It will be understood, however, that availability and abundance of specific lignocellulosic biomass materials is subject to geographic variation. For example, in sugar cane growing areas bagasse is likely to be more abundantly available than wood or straw.

FIG. 1 shows a specific embodiment of a conversion unit suitable for the process of the present invention. It will be understood that other conversion units may be used, provided that the essential aspect of the process can be accomplished.

FIG. 1 shows a conversion unit 1, comprising a stripper/reactor 10. A composite of solid, particulate biomass and a catalytic material is fed into stripper/reactor 10 at one or both of inlets 11 and 12. In upper zone 12 of stripper/reactor 10 the biomass/catalyst composite is contacted with a particulate heat carrier material from regenerator 20.

The heat carrier material may be an inert material, such as sand. The heat carrier may also comprise a particulate inorganic catalytic material. Examples of suitable catalytic material include layered anionic materials, in particular hydrotalcite and hydrotalcite-like materials; and crystalline aluminosilicates, such as zeolites. ZSM-5 is particularly suitable. The heat carrier material may also be a mixture of an inert material and a catalytic material.

In a preferred embodiment a spray curtain of particulate heat carrier material is formed at 14. Composite biomass/catalyst material is sprayed into the curtain from inlet 11

The temperature of the particulate heat carrier material is such that the reaction temperature in zone 12 of stripper/reactor 10 is in the range of from 250 to 400° C. It may be necessary to cool the particulate heat carrier material by means of heat exchanger 21.

Volatile reaction products are removed from stripper/reactor 10 at outlet 15. Entrained solid particles (both particulate heat carrier material and unconverted solid biomass) are separated from the product stream in cyclone 16, and fed back into stripper/reactor 10 at inlet 17. The product stream is fed into fractionator 30 at inlet 31.

A second stream of hot particulate heat carrier material is introduced into stripper/reactor 10 at inlet 18, thereby creating a second zone 13 with a reaction temperature that is different from the reaction temperature in zone 12. In the depicted embodiment the temperature in zone 13 is higher than the temperature in zone 12, as a result of cooling of the particulate heat carrier in heat exchanger 21. It will be understood that, with minor modifications, the unit can be run such that zone 12 has a higher temperature than zone 13.

The temperature in zone 13 can be further modified by injecting a fluid at injection point 19. This may be a cold fluid, if a (cold) quench is desired, or a hot fluid, it a hot boost is desired. The fluid may be a gas, a liquid, or a gas-entrained solid.

In a particular embodiment the hot boost comprises spraying a hot solid heat carrier material onto the solid biomass material from zone 12. Preferably the solid heat carrier material comprises catalyst material.

In an alternate embodiment the fluid comprises a hydrogen donor material. Examples of suitable hydrogen donor materials include hydrogen and hydrocarbons, in particular paraffins. Suitable sources of hydrocarbon material include paraffinic crudes, light distillates and residues from petroleum refining activities.

In yet another embodiment the fluid comprises carbon monoxide. Suitably the fluid comprises flue gas from regenerator 20. As described in more detail below, char and coke deposit is on the particulate heat carrier particles is burned off in oxygen or an oxygen containing gas, such as air, in regenerator 20. Regeneration conditions may be chosen such as to produce a flue gas rich in carbon monoxide. The hot, CO-rich flue gas may be used as a hot boost at injection, point 19. The presence of CO in zone 13 promotes the decarboxylation and/or decarbonylation of biomass material present in this zone.

In an alternate embodiment, stripper/reactor 10 is replaced with two reactors in series. The first of these two reactors replaces zone 12, and contains the feed inlet 11 and product outlet 15. The second reactor replaces zone 13, and is operated at a temperature that is different from the first. The temperature adjustment is accomplished with a cold quench or a hot boost. Optionally, a hot boost may be supplemented with an injection of hot particulate heat carrier material.

As a result of the conversion reaction taking place in stripper/reactor 10, coke and char are deposited on the particulate heat carrier material. These deposits are burned off in regenerator 20 by exposing the particulate heat carrier material to oxygen or an oxygen-containing gas, such as air. Flue gas is removed from regenerator 20 via outlet 23, after entrained particulate material has been removed from it in cyclone 22.

As discussed above, it may be desirable to operate regenerator 20 in an oxygen-poor atmosphere, so as to produce a flue gas that is rich in CO. The flue gas may be recycled into stripper-reactor 10.

Reaction products from outlet 15 are transported to cyclone 16, where entrained particulate material is removed from the product stream. Particulate material, from cyclone 16, which may comprise particulate heat carrier material and solid biomass particles, is recycled back to stripper/reactor 10 via inlet 17.

Reaction product from cyclone 16 is sent to fractionator 30, where it is split into a gas stream one or more liquid product streams, 33A and/or 33B, and a heavy fraction 34. Heavy fraction 34 may be recycled to stripper/generator 10, for further conversion.

What is claimed is:

1. A process for the conversion of solid biomass to hydrocarbons comprising:
    a) contacting said solid biomass with a first catalyst stream comprising a catalyst in a first reaction zone operated at a temperature $T_1$ in the range of from about 250 to about 400° C., wherein said solid biomass is mixed with said first catalyst stream to form a first biomass-catalyst mixture, and wherein a portion of said solid biomass in said first biomass-catalyst mixture is converted forming a first gaseous product stream comprising hydrocarbons and a second biomass-catalyst mixture comprising said first catalyst stream and unconverted biomass;
    b) downwardly passing said second biomass-catalyst mixture to a second reaction zone;
    c) charging a second catalyst stream to said second reaction zone for contact with said second biomass-catalyst mixture, wherein said second reaction zone is operated at a temperature $T_2$, and wherein at least a portion of said unconverted biomass in said second biomass-catalyst mixture is converted forming a second gaseous product stream comprising hydrocarbons and a spent catalyst comprising coke;
    d) charging said spent catalyst to a regenerator wherein coke is burned off from said spent catalyst in the presence of oxygen thereby forming a regenerated catalyst;
    e) charging a portion of said regenerated catalyst to said first reaction zone as said first catalyst stream, and charging a portion of said regenerated catalyst to said second reaction zone as said second catalyst stream;
    f) upwardly passing said second gaseous product stream to said first reaction zone; and
    g) removing both said first gaseous product stream and said second gaseous product stream from said first reaction zone as a product mixture comprising hydrocarbons.

2. The process of claim 1 wherein $T_1$ is maintained less than $T_2$ by a method selected from the group consisting of: cooling said first catalyst stream, adjusting the flow rate of said first catalyst stream, injecting a fluid into said second reaction zone, adjusting the flow rate of said second catalyst stream, and combinations thereof.

3. The process of claim 2 wherein said fluid comprises carbon monoxide.

4. The process of claim 2 wherein said fluid comprises a hydrogen donor material.

5. The process of claim 1 wherein $T_2$ is maintained less than $T_1$ by a method selected from the group consisting of cooling said first catalyst stream, adjusting the flow rate of said first catalyst stream, injecting a fluid into said second reaction zone, adjusting the flow rate of said second catalyst stream, and combinations thereof.

6. The process of claim 5 wherein said fluid comprises carbon monoxide.

7. The process of claim 5 wherein said fluid comprises a hydrogen donor material.

8. The process of claim 1 wherein said product mixture further comprises a portion of said catalyst, and said product mixture is charged to a cyclone for separation into a hydrocarbon stream comprising said hydrocarbons and into a third catalyst stream; wherein said third catalyst stream is charged to said second reaction zone; and wherein said hydrocarbon stream is charged to a fractionator for separation into a gas stream, at least one liquid product stream, and a heavy fraction; and wherein said heavy fraction is charged to a zone selected from the group consisting of: said first reaction zone, said second reaction zone, and combinations thereof.

9. The process of claim 1 wherein the combined contact time of said solid biomass with said catalyst in said first reaction zone and said second reaction zone is in the range of from about 50 to about 1000 milliseconds.

10. The process of claim 1 wherein the combined contact time of said solid biomass with said catalyst in said first reaction zone and said second reaction zone is in the range of from about 100 to about 500 milliseconds.

11. A system comprising:
 a) a pyrolysis reactor comprising a first reaction zone and a second reaction zone located spatially below said first reaction zone;
 b) a regenerator which is: operably related in fluid flow communication by a first conduit to the top of said pyrolysis reactor; operably related in fluid flow communication by a second conduit to the bottom of said pyrolysis reactor; and operably related in fluid flow communication by a third conduit to said second reaction zone; and
 c) a fourth conduit operably related in fluid flow communication with said first reaction zone of said pyrolysis reactor.

12. The system of claim 11 further comprising a cyclone which is operably related in fluid flow communication by a fifth conduit to said first reaction zone and is operably related in fluid flow communication by a sixth conduit to said pyrolysis reactor at a location below said first reaction zone.

13. The system of claim 12 further comprising a separation vessel which is operably related in fluid flow communication by a seventh conduit to said cyclone; wherein said separation vessel is operably related in fluid flow communication with a gas conduit, operably related to at least two product conduits and operably related to a heavy fraction conduit.

14. The system of claim 13 wherein:
 a) solid biomass is charged to said first reaction zone by said fourth conduit for contact with a first catalyst stream comprising a catalyst which is charged to said first reaction zone by said first conduit, wherein said first reaction zone is operated at a temperature $T_1$ in the range of from about 250 to about 400° C.; wherein said solid biomass is mixed with said first catalyst stream to form a first biomass-catalyst mixture, and wherein a portion of said solid biomass in said first biomass-catalyst mixture is converted forming a first gaseous product stream comprising hydrocarbons and a second biomass-catalyst mixture comprising said first catalyst stream and unconverted biomass;
 b) downwardly passing said second biomass-catalyst mixture to said second reaction zone;
 c) charging a second catalyst stream to said second reaction zone by said third conduit for contact with said second biomass-catalyst mixture, wherein said second reaction zone is operated at a temperature $T_2$, and wherein at least a portion of said unconverted biomass in said second biomass-catalyst mixture is converted forming a second gaseous product stream comprising hydrocarbons and a spent catalyst comprising coke;
 d) charging said spent catalyst to said regenerator by said second conduit wherein coke is burned off from said spent catalyst in the presence of oxygen thereby forming a regenerated catalyst;
 e) charging a portion of said regenerated catalyst to said first reaction zone as said first catalyst stream by said first conduit, and charging a portion of said regenerated catalyst to said second reaction zone by said third conduit as said second catalyst stream;
 f) upwardly passing said second gaseous product stream to said first reaction zone; and
 g) removing both said first gaseous product stream and said second gaseous product stream from said first reaction zone by said fifth conduit as a product mixture comprising hydrocarbons.

15. The system of claim 14 wherein $T_1$ is maintained less than $T_2$ by a method selected from the group consisting of cooling said first catalyst stream, adjusting the flow rate of said first catalyst stream, injecting a fluid into said second reaction zone, adjusting the flow rate of said second catalyst stream, and combinations thereof.

16. The system of claim 14 wherein $T_2$ is maintained less than $T_1$ by a method selected from the group consisting of cooling said first catalyst stream, adjusting the flow rate of said first catalyst stream, injecting a fluid into said second reaction zone, adjusting the flow rate of said second catalyst stream, and combinations thereof.

17. The system of claim 14 wherein said product mixture further comprises a portion of said catalyst, and said product mixture is charged to said cyclone by said fifth conduit for separation into a hydrocarbon stream comprising said hydrocarbons and into a third catalyst stream; wherein said third catalyst stream is charged to said second reaction zone by said sixth conduit.

18. The system of claim 17 wherein said hydrocarbon stream is charged to said fractionator by said seventh conduit for separation into a gas stream removed from said fractionator by said gas conduit, at least one liquid product stream removed from said fractionator by said product conduits, and a heavy fraction removed from said fractionator by said heavy fraction conduit; and wherein said heavy fraction is charged to a zone selected from the group consisting of 1) said first reaction zone by an eighth conduit operably related to said fractionator and to said first reaction zone, 2) said second reaction zone by a ninth conduit operably related to said fractionator and to said second reaction zone, and 3) combinations thereof.

19. The system of claim 17 wherein the combined contact time of said solid biomass with said catalyst in said first reaction zone and said second reaction zone is in the range of from about 50 to about 1000 milliseconds.

20. The system of claim 17 wherein, the combined contact time of said solid biomass with said catalyst in said first reaction zone and said second reaction zone is in the range of from about 100 to about 500 milliseconds.

* * * * *